United States Patent
Herzberg

(10) Patent No.: US 8,931,974 B2
(45) Date of Patent: Jan. 13, 2015

(54) BUILDING MACHINE COMPRISING A SIGNALING DEVICE

(71) Applicant: Joseph Voegele AG, Ludwigshafen/Rhein (DE)

(72) Inventor: Ingo Herzberg, Angelbachtal (DE)

(73) Assignee: Joseph Voegele AG (DE)

( * ) Notice: Subject to any disclaimer, the term of this patent is extended or adjusted under 35 U.S.C. 154(b) by 0 days.

(21) Appl. No.: 13/859,150

(22) Filed: Apr. 9, 2013

(65) Prior Publication Data

US 2013/0266376 A1 Oct. 10, 2013

(30) Foreign Application Priority Data

Apr. 10, 2012 (DE) ...................... 20 2012 003 689 U

(51) Int. Cl.
*E01C 19/00* (2006.01)
*E01C 19/48* (2006.01)
*B60Q 1/26* (2006.01)

(52) U.S. Cl.
CPC ................. *E01C 19/00* (2013.01); *E01C 19/48* (2013.01); *B60Q 1/2665* (2013.01); *E01C 2301/30* (2013.01)
USPC .................... 404/84.05; 404/118; 340/426.15

(58) Field of Classification Search
CPC ......... E01C 19/22; E01C 19/46; E01C 19/48; B60Q 1/2665
USPC .............. 404/118; 116/202; 340/431, 426.15, 340/932.2; 701/50
See application file for complete search history.

(56) References Cited

U.S. PATENT DOCUMENTS

| D370,917 S | * | 6/1996 | Swisher, Jr. ................... D15/29 |
| 7,470,082 B2 | * | 12/2008 | Lloyd .............................. 404/85 |
| D660,876 S | * | 5/2012 | Ewringmann ................. D15/22 |
| D670,744 S | * | 11/2012 | Ewringmann ................. D15/30 |
| D681,067 S | * | 4/2013 | Ewringmann ................. D15/28 |
| D693,749 S | * | 11/2013 | Ewringmann ................ D12/187 |
| 2002/0182009 A1 | | 12/2002 | Barnat et al. |
| 2010/0283598 A1 | | 11/2010 | King et al. |
| 2011/0123268 A1 | | 5/2011 | Berning et al. |

FOREIGN PATENT DOCUMENTS

| DE | 29609704 U1 | 10/1996 |
| DE | 102009041842 A1 | 9/2011 |
| EP | 0667415 A1 | 8/1995 |
| JP | 4-122711 U | 11/1992 |

(Continued)

OTHER PUBLICATIONS

Extended European Search Report Dated Jul. 19, 2013, Application No. 13001832.8-1604, Applicant Joseph Voegele AG, 4 Pages.

(Continued)

*Primary Examiner* — Raymond W Addie
(74) *Attorney, Agent, or Firm* — Brooks Kushman P.C.

(57) ABSTRACT

A self propelled building machine includes a drive, a cover covering the drive, a control platform and a material hopper which includes a filling hole and that can be filled with material by an external supply unit. The building machine is further provided with a signaling device for signaling material filling parameters to the external supply unit. In addition, the building machine comprises at least one external mirror, wherein the at least one external mirror and the signaling device are attached to the building machine by means of a common holder.

18 Claims, 4 Drawing Sheets

(56) References Cited

FOREIGN PATENT DOCUMENTS

| | | | |
|---|---|---|---|
| JP | 7-43133 | Y2 | 10/1995 |
| JP | 2004-338431 | A | 12/2004 |
| JP | 3141626 | U | 4/2008 |
| JP | 2009-126470 | A | 6/2009 |

OTHER PUBLICATIONS

German Search Report Dated Mar. 7, 2013, Application No. 20 2012 003 689.0. 5 Pages.
Japanese Office Action Dated Jun. 17, 2014, Application No. 2013-069550, 6 Pages.

* cited by examiner

BUILDING MACHINE COMPRISING A SIGNALING DEVICE

CROSS-REFERENCE TO RELATED APPLICATIONS

This application claims foreign priority benefits under 35 U.S.C. §119(a)-(d) to German patent application number DE 20 2012 003 689.0, filed Apr. 10, 2012, which is incorporated by reference in its entirety.

TECHNICAL FIELD

The present disclosure relates to a building machine comprising a signaling device.

BACKGROUND

It is known from practice, and for instance from EP 0 667 415 A1, that certain self propelled building machines, e.g., road finishers or chargers, have to be supplied with material during their operation. This process, which is called charging, is carried out during the driving operation, for instance by a truck driving backwards and approaching the road finisher or charger, which moves forwards at the same time, and tipping the material from its load area into the material hopper of the road finisher or charger. While the charging takes place the truck is pushed forward by the road finisher or charger. This means that some coordinated driving maneuvers are necessary to enable the charging. As a whole, this charging process therefore requires a high degree of coordination between the driver of the road finisher or charger and the truck driver. For this reason EP 0 667 415 A1 proposes a means for monitoring and displaying parameters regarding the charging with road-laying material, which is mounted on the road finisher or charger so as to display certain commands or signals regarding the operation to the truck driver. The disadvantage of the prior signaling devices is that the attachment thereof to the road finisher or charger is complicated. Frequently these signaling devices are mounted at places that restrict the viewing area of the driver of the road finisher or charger and, thus, have a negative influence on the driving safety.

SUMMARY

It is an object of the present disclosure to provide a building machine comprising a signaling device, by means of which an improved charging of the building machine is achieved with means that are as simple as possible in terms of construction, and which enhances the driving safety of the building machine.

According to the disclosure the self propelled building machine comprises at least one external mirror and a signaling device which are attached to the building machine by means of a common holder. This arrangement of the signaling device has the advantage that the all-round visibility of the vehicle driver is clearly improved, especially in the danger zone of the building machine, as no other separate device obstructing the view has to be mounted on the building machine in addition to the external mirrors. Furthermore, the at least one external mirror is usually situated at a place of the building machine that can be perfectly seen by the vehicle driver of the truck in front, so that he can also easily read the display. Thus, the arrangement of the signaling device according to the disclosure allows an optimal utilization of the available space of the building machine and a better readability of the signaling device during the charging process.

Preferably, the external mirror is a rear-view mirror of the building machine, wherein the signaling device and the rear-view mirror are arranged on different sides of the holder. This means that the reflective surface of the external mirror points backwards in the driving direction of the building machine, while the signaling device points forwards in the driving direction of the building machine. This ensures that the signaling device and the rear-view mirror do not obstruct each other in terms of view.

In an advantageous modified embodiment of the disclosure the signaling device comprises a display panel which can be controlled from an operating console of the building machine. As the all-round visibility of the driver of the building machine during the filling of the material is usually better than the all-round visibility of the truck driver it is sensible if the driver of the building machine presets the drive commands to be displayed in the signaling device. Ideally, the operating console comprises for this purpose easily distinguishable and comprehensible control keys which allow an intuitive choice of the signals to be displayed.

It is a particular advantage if the display panel comprises at least one LED light-display panel by means of which different symbols can be displayed. The use of the LED technology permits a bright, high-contrast representation of the signals and a good and unequivocal readability of the displayed signals. The presentability of different colors additionally increases the comprehensibility of the displayed symbols.

It is useful if the signaling device is controlled on the basis of parameters which are determined by means of at least one sensor of the building machine. For instance, it is possible to determine the distance between the building machine and the truck in front by means of distance sensors, and choose the symbols to be displayed on the basis thereof. To guarantee maximum safety, the automatically generated symbols may be manually altered at any time by means of the operating console and the sensors thus be overdriven, respectively.

It is particularly advantageous if the holder for the external mirror and the signaling device is attached to a cover for the drive of the building machine. For instance, the holder may be attached to the attachment site provided for this purpose on the engine hood. This allows an attachment of the mirror and/or the signaling device to different types of the building machines, which are delivered for instance with or without an overhead guard.

According to another advantageous modification of the disclosure the holder for the at least one external mirror and the signaling device is attached to the overhead guard of the building machine's drivers station. On such a building machine the attachment of the holder preferably on the overhead guard allows an optimal all-round view for the driver of the building machine.

It is useful if the orientation of the mirror and/or the signaling device is adjustable. Thus, it is possible to adjust the external mirror in dependence on the height of the vehicle driver, his position on the building machine or the desired viewing angle. An adjustable signaling device allows the optimal orientation for truck drivers, taking into account different positions or heights.

It is particularly advantageous if a holder is respectively provided for the left and the right side of the building machine, and if a signaling device is provided on each of the holders. This ensures that the vehicle driver of the truck in front always has at least one signaling device in his field of vision. For instance, the signaling devices may be oriented on the building machine in such a way that the truck driver is able to respectively view one signaling device in one rear-view mirror.

To obtain a particularly good readability of the signaling device and the display panel, respectively, the signaling device may comprise a housing part which projects over the display panel and defines a glare shield protecting the display panel from sunlight exposure. This clearly improves the contrast of the display panel and, at the same time, the readability of same.

The above-described advantages can be made use of particularly well if the self propelled building machine is a road finisher or a charger.

An advantageous embodiment of the disclosure will be explained in more detail below with reference to the attached drawings.

DETAILED DESCRIPTION

Like components are provided with like reference numbers throughout the figures.

Figure 1:
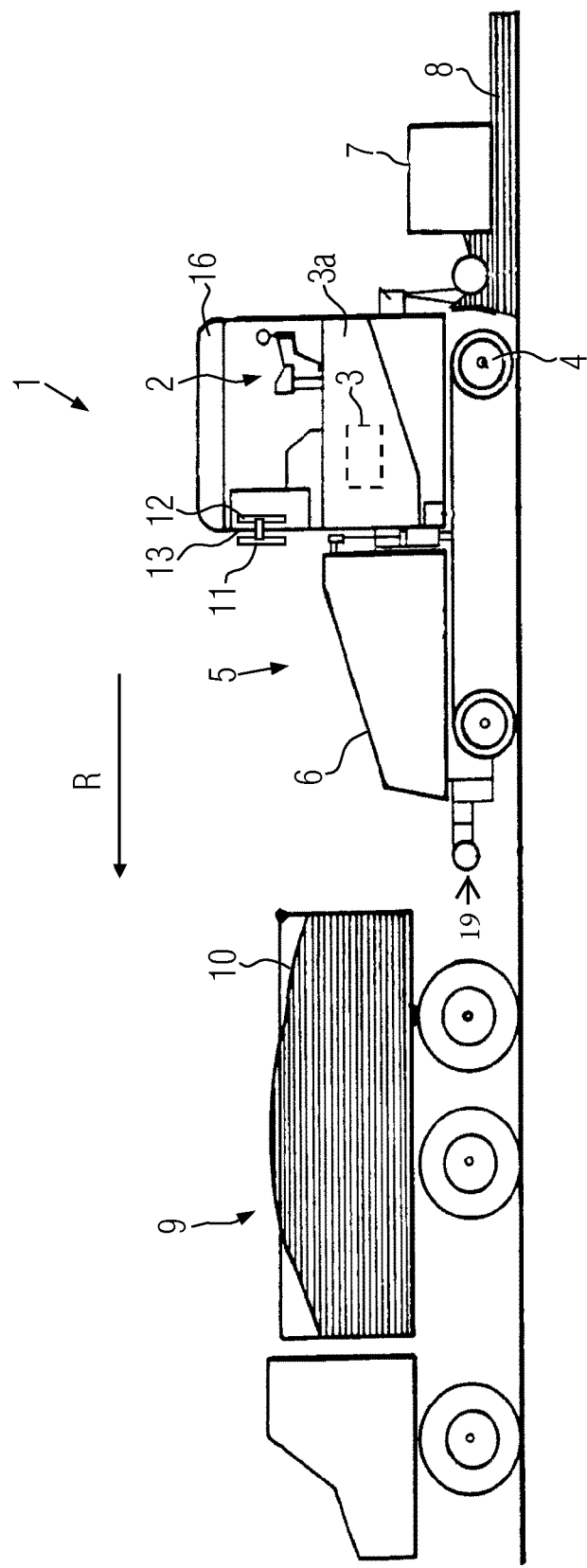
FIG. 1 shows a schematic lateral view of a self propelled building machine according to the disclosure and an external supply unit driving in front of the building machine.

FIG. 1 shows a schematic lateral view of an self propelled building machine 1 which, in this embodiment, is a schematized road finisher.

The road finisher 1 comprises a control platform 2 from which the road finisher 1 is controlled by a vehicle driver. For driving the vehicle the road finisher comprises a drive 3, e.g., a diesel engine, which is arranged underneath a cover 3a and drives at least one axle 4 of the road finisher. To receive a supply of road-laying material the road finisher 1 is provided with a material hopper 5 which includes a filling hole 6 that is at least partially open in an upward direction. In addition, the road finisher 1 trails a screed 7 at the rear in the driving direction R in order to convert the road-laying material from the material hopper 5 into a road topping 8.

FIG. 1 further shows that a truck 9 drives in front of the road finisher 1 and conveys on its load area 10 additional road-laying material provided for filling the material hopper 5 of the road finisher 1. This means that the truck 9 is provided as an external supply unit for the road finisher 1 and is meant to supply the road finisher 1 with new road-laying material during the road-laying operation.

FIG. 1 further shows an assembly on the road finisher 1 comprising a signaling device 11, an external mirror 12 and a holder 13. The holder 13 serves the common attachment of the signaling device 11 and the external mirror 12 to the road finisher 1.

Figure 2:
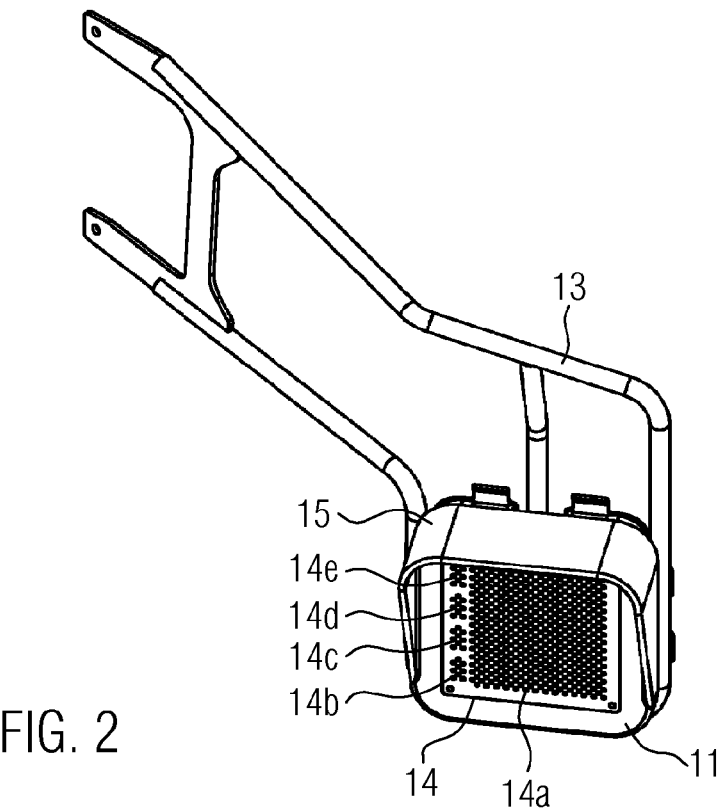
FIG. 2 Shows a perspective view of a signaling device attached to a holder according to the disclosure.

The signaling device 11 attached to holder 13 can be seen particularly well in FIG. 2 which shows a perspective view of the signaling device 11 attached to the holder 13. It can clearly be seen that the signaling device 11 includes a display panel 14 which serves to display drive commands for the vehicle driver of the truck 9 and displays information about the movements of the road finisher 1. In this example, the display panel 14 is subdivided into several sub-panels 14a to 14e. The sub-panels 14b to 14e display to the vehicle driver of the truck 9 that the road finisher 1, too, is currently moving. This means, as soon as the road finisher 1 moves a corresponding display appears in the sub-panels 14b to 14e.

The sub-panels 14a to 14e of the display panel 14 are each designed as LED panels which ensure a particularly high-contrast representation of different symbols with a high resolution and in different colors. Moreover, it is well recognizable in FIG. 2 that the signaling device 11 comprises a housing part 15 which projects over the display panel 14 and protects same from excessive light irradiation. Despite direct sunlight it is, thus, also possible to guarantee a good readability of the display panel 14.

Figure 3:
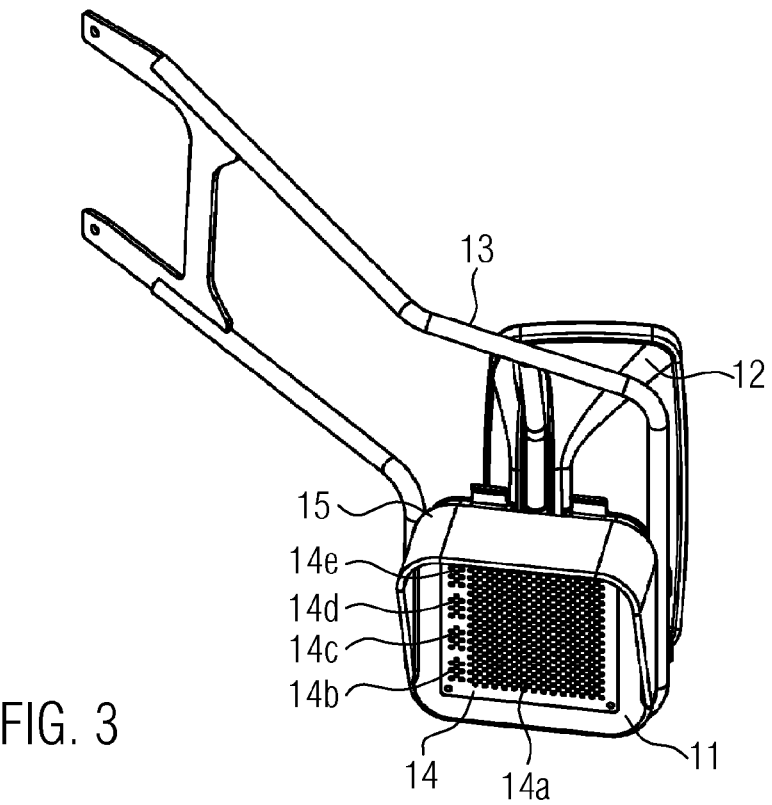
FIG. 3 shows a perspective view of a rear-view mirror arranged according to the disclosure on a common holder and of a signaling device arranged on the holder.

FIG. 3 shows a perspective view of the signaling device 11 and the holder 13 of FIG. 2. The holder 13 now additionally has the external mirror 12 of the road finisher 1 attached to it. It can be seen that the signaling device 11 and the external mirror 12 are each arranged on and attached to different sides of the holder 13. Thus, only one single attaching possibility for the holder 13 on the road finisher 1 has to be provided so as to simultaneously attach the signaling device 11 and the external mirror 12 to the road finisher 1. In this case, the external mirror 12 and/or the signaling device 11 are each mounted on the holder 13 to be adjustable and pivotable as desired by the driver.

Figure 4:
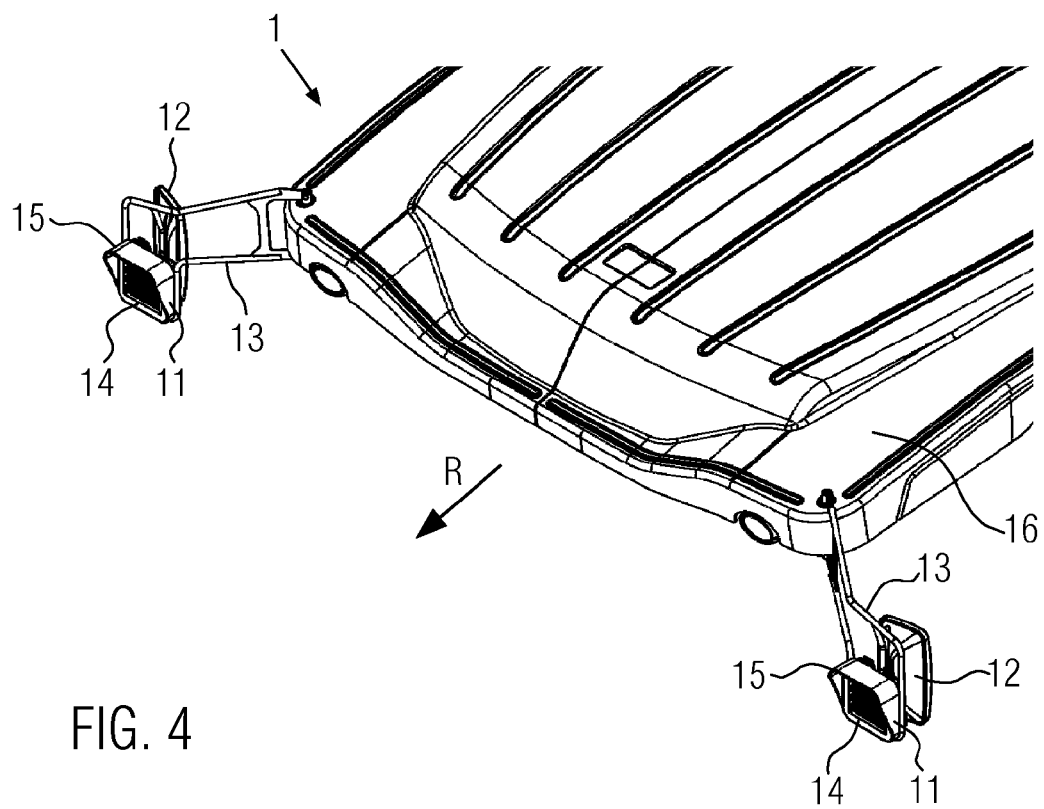
FIG. 4 shows a perspective front view of two holders according to the disclosure each having a rear-view mirror and a signaling device, and arranged on an overhead guard of an automotive building machine.

FIG. 4 shows the assembly of the signaling device 11, the external mirror 12 and the holder 13 of FIG. 3 attached to an overhead guard 16 of the road finisher 1. It can be seen particularly well that that signaling device 11 is oriented forwards in the driving direction R, i.e., in the direction of the truck 9 driving in front of the road finisher 1. Correspondingly, the reflective surfaces 17 of the external mirror 12 are oriented backwards in the driving direction R of the road finisher 1 so as to provide the vehicle driver of the road finisher 1 with a good view backwards. To further increase the driving safety for the road finisher 1 and the truck 9 an assembly of signaling device 11, external mirror 12 and holder 13 is respectively attached to the left side and the right side of the overhead guard 16 of the road finisher 1.

Figure 5:
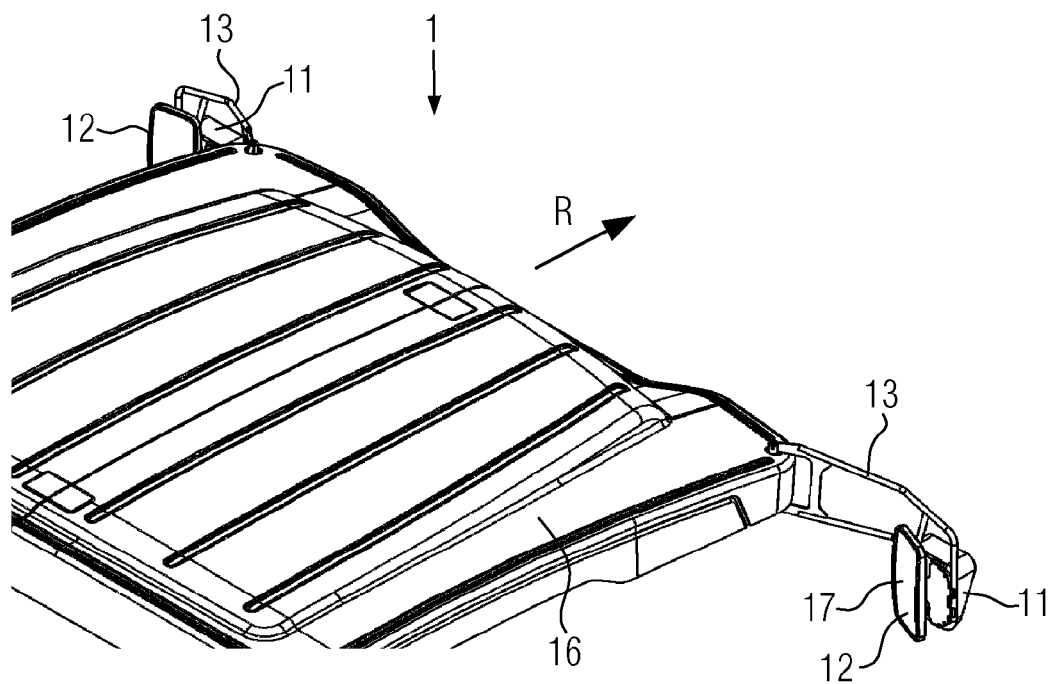
FIG. 5 shows the arrangement according to the disclosure of the two holders of FIG. 4 in a perspective rear view.

FIG. 5 shows the assembly known from FIG. 4 on the overhead guard 16 in a perspective rear view. The reflective surfaces 17 of the external mirror 12 and the orientation thereof can be seen particularly well.

Figure 6:
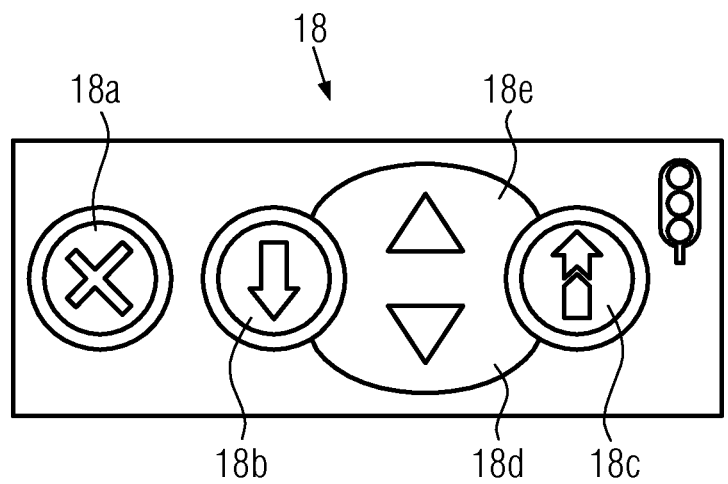
FIG. 6 shows a schematic representation of an embodiment of an operating console for a signaling device arranged on a building machine.

FIG. 6 shows a schematic view of an operating console 18 which is provided for controlling the display panel 14 of the signaling device 11. To this end, the operating console 18 comprises a plurality of control keys 18a to 18e whose actuation generates a corresponding symbol in the display panel 14 or the sub-panel 14a. By operating the operating console 18 the vehicle driver of the road finisher 1 is thus capable of signaling to the vehicle driver of the truck 9 a drive command necessary for the material filling in the form of an easily recognizable symbol. For instance, the operation of the control key 18a generates an "X" which is displayed in red color, telling the vehicle driver of the truck 9 to "stop". On the other hand, a green arrow shown in the display panel 14a and generated by pressing control key 18b signals to the vehicle driver of the truck 9 that he may approach the material hopper 5 of the road finisher 1 backwards. The other symbols, too, which are generated on the display panel 14a of the signaling device 11 in colors easy to identify, are clearly recognizable by the vehicle driver of the truck 9 as specific drive commands. Owing to the high-contrast representation they are well distinguishable from each other.

Based on the embodiment described it is possible to modify the building machine according to the disclosure in many ways.

Figure 7:
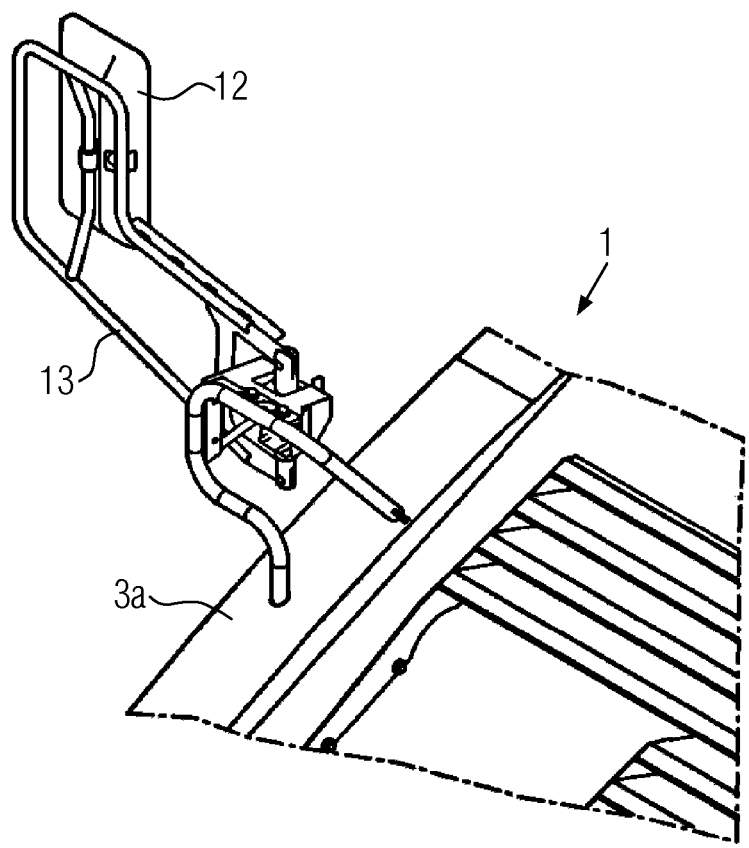
FIG. 7 shows a perspective view of an alternative possibility for attaching the holder according to the disclosure including a rear-view mirror on a building machine.

In an exemplary modification illustrated in FIG. 7 the holder 13 for the external mirror 12 and/or the signaling device 11 may also be mounted on the cover 3a, i.e., on the engine hood of the road finisher 1. This is particularly advantageous if the road finisher 1 is to be constructed and delivered without the overhead guard 16.

Moreover, the symbols represented by the signaling device 11 may not only be controlled and generated by the operating console 18 operated by the vehicle driver of the road finisher 1, but also by a plurality of sensors, e.g., distance sensors 19. In this case, the inputs made on the operating console 18 are always prioritized in such a way that the vehicle driver of the road finisher 1 is capable at any time of interfering with respect to the symbols represented in the display panel 14 of the signaling device 11.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A self propelled building machine comprising:
a drive;
a cover covering the drive;
a control platform;
a material hopper that includes a filling hole and that can be filled with material by an external supply unit;
a console that is useable by a driver of the building machine;
at least one distance sensor;
a signaling device for signaling material filling parameters to the external supply unit, the signaling device comprising a display panel that is configured to be controlled from the console, wherein the console is configured for the driver of the building machine to choose drive commands for the external supply unit to be displayed by the display panel;
an external mirror; and
a common holder that attaches the external mirror and the signaling device to a portion of the building machine;
wherein the display panel of the signaling device is configured to be controlled based on a distance between the building machine and the external supply unit that is determined by means of the at least one distance sensor.

2. The building machine according to claim 1 wherein the external mirror is a rear-view mirror, and the signaling device and the rear-view mirror are arranged on different sides of the holder.

3. The building machine according to claim 1 wherein the display panel comprises at least one LED light-display panel by means of which different symbols can be displayed.

4. The building machine according to claim 1 wherein the holder is attached to the cover that covers the drive.

5. The building machine according to claim 1 wherein the portion to which the holder is attached comprises an overhead guard.

6. The building machine according to claim 1 wherein orientation of the external mirror and/or the signaling device are/is adjustable.

7. The building machine according to claim 1 further comprising an additional holder and an additional signaling device provided on the additional holder, wherein the holder and the additional holder are attached to left and right sides, respectively, of the building machine.

8. The building machine according to claim 1 wherein the signaling device comprises a housing part that projects over the display panel to increase readability of the display panel.

9. The building machine according to claim 1 wherein the building machine is a road finisher or charger.

10. The building machine according to claim 1 wherein the drive commands include a command for advising a driver of the external supply unit to stop.

11. The building machine according to claim 1 wherein the drive commands include a command for advising a driver of the external supply unit that he may approach the material hopper backwards.

12. The building machine according to claim 1 wherein the display panel is configured to display information about movement of the building machine.

13. The building machine according to claim 1 wherein the signaling device is configured to automatically provide a symbol to be displayed by the display panel based on the determined distance.

14. A self propelled building machine comprising:
a material hopper that can be filled with material by an external supply unit;
a console that is useable by a driver of the building machine;
at least one distance sensor;
a signaling device for signaling material filling parameters to the external supply unit, the signaling device comprising a display panel that is configured to be controlled from the console, wherein the console is configured for the driver of the building machine to choose drive commands for the external supply unit to be displayed by the display panel;
at least one external mirror; and
a common holder that attaches the at least one external mirror and the signaling device to a portion of the building machine
wherein the display panel of the signaling device is configured to be controlled based on a distance between the building machine and the external supply unit that is determined by means of the at least one distance sensor.

15. The building machine according to claim 14 wherein the drive commands include a command for advising a driver of the external supply unit to stop.

16. The building machine according to claim 14 wherein the drive commands include a command for advising a driver of the external supply unit that he may approach the material hopper backwards.

17. The building machine according to claim 14 wherein the display panel is configured to display information about movement of the building machine.

18. The building machine according to claim 14 wherein the signaling device is configured to automatically provide a symbol to be displayed by the display panel based on the determined distance.

* * * * *